(12) United States Patent
Fan

(10) Patent No.: US 9,889,800 B1
(45) Date of Patent: Feb. 13, 2018

(54) CAR CD SLOT MOUNT FOR PERSONAL ELECTRONIC DEVICE

(71) Applicant: Eagle Fan, Chu-Pei (TW)

(72) Inventor: Eagle Fan, Chu-Pei (TW)

( * ) Notice: Subject to any disclaimer, the term of this patent is extended or adjusted under 35 U.S.C. 154(b) by 73 days.

(21) Appl. No.: 15/232,301

(22) Filed: Aug. 9, 2016

(30) Foreign Application Priority Data

Jul. 22, 2016 (TW) ............................. 105211125 U

(51) Int. Cl.
*B60R 11/00* (2006.01)
*B60R 11/02* (2006.01)

(52) U.S. Cl.
CPC ...... *B60R 11/0241* (2013.01); *B60R 11/0258* (2013.01); *B60R 2011/0005* (2013.01); *B60R 2011/008* (2013.01)

(58) Field of Classification Search
CPC ............. B60R 11/0241; B60R 11/0258; B60R 2011/0005; B60R 2011/008
USPC ................ 224/483, 552, 554–556, 558, 929; 248/27.1, 27.3, 224.8, 225.11, 231.9, 248/291.1; 269/3, 6, 71
See application file for complete search history.

(56) References Cited

U.S. PATENT DOCUMENTS

| 1,688,765 A | * | 10/1928 | Veras | A61J 9/0638 224/409 |
|---|---|---|---|---|
| 1,908,470 A | * | 5/1933 | Beuttner | A47F 3/12 211/153 |
| 2,598,670 A | * | 6/1952 | Bentley | B60K 15/05 220/262 |
| 3,056,412 A | * | 10/1962 | Wolfe | A24F 9/14 131/260 |
| 3,071,338 A | * | 1/1963 | Kaufman | H01Q 1/3258 224/929 |
| 3,964,612 A | * | 6/1976 | Skilliter, Jr. | B60R 11/02 211/26 |
| 4,186,903 A | * | 2/1980 | Fazakerley | E06C 7/143 248/210 |
| 4,194,338 A | * | 3/1980 | Trafton | E04C 3/32 256/65.03 |
| 4,256,281 A | * | 3/1981 | Harris | B62J 11/00 224/414 |
| 4,320,892 A | * | 3/1982 | Longbrake | B24B 3/54 269/3 |
| 4,535,923 A | * | 8/1985 | Manke | B60N 3/103 224/272 |
| 4,648,672 A | * | 3/1987 | Kobler | H01R 13/5208 439/271 |

(Continued)

*Primary Examiner* — Peter Helvey
(74) *Attorney, Agent, or Firm* — Rabin & Berdo, P.C.

(57) ABSTRACT

A car CD slot mount includes an installing unit having a front side, a rear side, first and second inserts extend outwardly from the front side in a staggered manner to define an acute angle greater than 5 degrees. The installing unit further has upper and lower sides defining upper and lower regions respectively, wherein the upper region has a bottom surface formed with a sliding channel while the lower region has a bottom surface formed with a coupling channel. A fixing unit includes a fixing element and a location adjustment element having a sliding block disposed slidably in the sliding channel and extends upward at partially from the rear side in such a manner to link up with the fixing element, which holds a personal electronic device stably therein. A bendable support bar is coupled detachably to the coupling channel of the installing unit.

8 Claims, 6 Drawing Sheets

(56) References Cited

U.S. PATENT DOCUMENTS

| | | | | |
|---|---|---|---|---|
| 4,714,239 A * | 12/1987 | LeVine | B24D 15/08 | 269/3 |
| 4,776,553 A * | 10/1988 | Kobayashi | H04M 1/06 | 224/929 |
| 4,858,990 A * | 8/1989 | Combs-Rose | A47C 7/66 | 135/96 |
| 4,887,753 A * | 12/1989 | Allen | B60R 11/02 | 224/312 |
| 4,887,784 A * | 12/1989 | Kayali | B60N 3/102 | 248/231.51 |
| 4,997,156 A * | 3/1991 | Allen | A47C 7/68 | 248/231.51 |
| 5,014,956 A * | 5/1991 | Kayali | B60N 3/102 | 248/311.2 |
| 5,016,845 A * | 5/1991 | Pellegrino | A61J 9/0692 | 248/104 |
| 5,018,374 A * | 5/1991 | Montano | E05B 71/00 | 70/233 |
| 5,033,528 A * | 7/1991 | Volcani | A45B 17/00 | 160/351 |
| 5,044,577 A * | 9/1991 | Spearman | B60N 3/103 | 224/544 |
| 5,056,822 A * | 10/1991 | Shim | B60N 3/005 | 224/276 |
| 5,086,958 A * | 2/1992 | Nagy | B60N 3/002 | 224/277 |
| 5,109,411 A * | 4/1992 | O'Connell | B60R 11/0241 | 224/553 |
| 5,135,189 A * | 8/1992 | Ghazizadeh | F16M 11/40 | 248/104 |
| 5,138,801 A * | 8/1992 | Anthon | B24D 15/06 | 451/367 |
| 5,179,590 A * | 1/1993 | Wang | B60R 11/0241 | 224/482 |
| 5,187,744 A * | 2/1993 | Richter | B60R 11/0241 | 224/553 |
| 5,285,938 A * | 2/1994 | Fauchald | B60R 11/0241 | 224/482 |
| 5,392,350 A * | 2/1995 | Swanson | B60R 11/02 | 379/426 |
| 5,489,055 A * | 2/1996 | Levy | B60N 3/103 | 224/544 |
| 5,489,075 A * | 2/1996 | Ible | A61J 9/0692 | 24/298 |
| 5,529,271 A * | 6/1996 | Dunchock | B60R 11/0241 | 224/483 |
| 5,593,124 A * | 1/1997 | Wang | B60R 11/00 | 224/483 |
| 5,673,628 A * | 10/1997 | Boos | B60N 3/001 | 108/138 |
| 5,813,583 A * | 9/1998 | Benedeti | B60R 11/0211 | 108/45 |
| 5,853,158 A * | 12/1998 | Riggle | A47G 23/0225 | 248/103 |
| 5,961,083 A * | 10/1999 | Hartmann | B60N 3/101 | 248/222.14 |
| 5,979,724 A * | 11/1999 | Loewenthal, Jr. | B60R 11/0241 | 224/483 |
| 5,996,957 A * | 12/1999 | Kurtz | A47G 23/0225 | 248/231.21 |
| 6,138,969 A * | 10/2000 | Olausson | B60R 11/02 | 224/483 |
| 6,227,511 B1* | 5/2001 | De Costa | A47C 7/62 | 248/311.2 |
| 6,317,497 B1* | 11/2001 | Ou | B60R 11/02 | 379/446 |
| 6,322,028 B1* | 11/2001 | Fleckenstein | E06C 7/14 | 182/129 |
| 6,357,710 B1* | 3/2002 | Fielden | A45B 11/00 | 248/231.51 |
| 6,560,983 B1* | 5/2003 | Schimmeyer | B60N 3/103 | 248/311.2 |
| 6,779,765 B2* | 8/2004 | Zheng | B60R 11/02 | 248/206.3 |
| 6,832,745 B2* | 12/2004 | Lindsay | B60N 3/103 | 248/214 |
| 6,896,231 B1* | 5/2005 | Sullivan, Sr. | A47G 23/0225 | 248/276.1 |
| 6,929,229 B1* | 8/2005 | Palmby | A47G 23/0225 | 248/311.2 |
| 7,090,183 B2* | 8/2006 | Heybl | A47G 23/0225 | 224/567 |
| 7,403,613 B2* | 7/2008 | Liou | B60R 11/00 | 379/446 |
| 8,675,888 B2* | 3/2014 | Yoon | H04B 1/082 | 381/86 |
| 2007/0223726 A1* | 9/2007 | Dunn | B60R 11/00 | 381/86 |
| 2007/0278274 A1* | 12/2007 | Dunn | B60R 11/00 | 224/483 |
| 2008/0173567 A1* | 7/2008 | Magee | B60N 3/002 | 206/562 |
| 2008/0190978 A1* | 8/2008 | Brassard | B60R 11/02 | 224/483 |

* cited by examiner

CAR CD SLOT MOUNT FOR PERSONAL ELECTRONIC DEVICE

CROSS-REFERENCE TO RELATED APPLICATION

The present application is based on, and claims priority form, Taiwan Patent Application No. 105211125, filed Jul. 22, 2016, the disclosure of which is hereby incorporated by reference herein in its entirety.

TECHNICAL FIELD

The present invention relates generally to a mounting device, and more particularly to a car CD (compact disk) slot mount for use in a car for holding a personal electronic device.

BACKGROUND

Generally we use suction devices in a car when it is desired to mount an electronic device, like GPS (Global Positioning System) or mobile phone. Since the suction device includes a suction cup that is adhered onto a car windshield and after assembly of an electronic device thereon, the entire assembly may sometimes hinders the viewing sight or vision of a driving person. In addition, the suction cup looses its suction ability as time runs out.

Therefore, most vehicles are provided with CD (compact disk) slots in their car dashboards so that CD player can be installed therein. In other words, the car CD slot serves a flat platform for mounting of a personal electronic device and is generally suitable for a particular configuration only. If the electronic device is mounted on the car windshield in a cantilever manner, the swaying of any parts of the two may hinders the viewing sight of the driving person and eventually leads to falling off from the windshield. Hence, a car CD slot mount that can hold a personal electronic device of any configuration is urgently needed in order to eliminate the problems encountered during use of prior art mounting device in cars.

SUMMARY OF THE INVENTION

A primary objective of the present invention is to provide a car CD slot mount that is adapted to be use in a car and that can hold a personal electronic device of any configuration.

A car CD slot mount of the present invention includes an installing unit, a device fixing unit and a bendable support bar. The installing unit, in form of a flat platform has a front side, a rear side opposite to and with a width smaller than a width of the front side, at least one first insert and one second insert mounted on the front side in such a manner that the first and second inserts extend outwardly therefrom in a staggered manner so as to define an acute angle greater than 5 degrees. The flat platform further has upper and lower sides defining upper and lower installing regions respectively, wherein the upper installing region has a bottom surface formed with a sliding channel while the lower installing region has a bottom surface formed with a coupling channel. The device fixing unit includes a fixing element and a location adjustment element having a sliding block disposed in the sliding channel of the flat platform and is slidable toward and away from the rear side in order adjust its location with respect to the rear side. The location adjustment element further extends upward at partially from the rear side in such a manner to link up with a rear side of the fixing element, which holds a personal electronic device securely therein. The bendable support bar is coupled detachably to the coupling channel of the flat platform.

One distinct feature of the present invention resides in that since the bendable support bar is linked detachably with the flat platform, after the installing unit is inserted into the CD slot in the car dashboard of different configurations, the support bar can be bent to a desired location so as to contact with the car dashboard, thereby preventing wobbling of the installing unit (the personal electronic device) during the driving of the car. Since the bendable support bar can be detached from the installing unit, the application of the car CD slot mount of the present invention is wide to compliment with the CD slots of different configurations.

Another distinct feature of the present invention resides in that since the sliding block is slidable in the sliding channel of the flat platform in order to adjust its location with respect to the rear side, and because the location adjustment element is located above the sliding block, the location of the installing unit can be adjusted with respect to the front side according to a desired requirement. Therefore, once the car CD slot mount of the present invention is installed in the car CD slot of a car, the position of the location adjustment element can be varied with respect to the car CD slot in the car dashboard. In other words, the car CD slot mount of the present invention can be implemented in cars with dashboards of different configurations.

Yet another distinct feature of the present invention resides in that the upper installing region has a resilient teeth formed in the bottom surface of the sliding channel. The sliding block has a bottom side formed with at least one elongated rack for meshing with the resilient teeth such that the position of the sliding block in the sliding channel can be sustained properly after adjustment.

BRIEF DESCRIPTION OF THE DRAWINGS

The present invention will be apparent to those skilled in the art by reading the following detailed description of a preferred embodiment thereof, with reference to the attached drawings, in which.

DETAILED DESCRIPTION OF THE PREFERRED EMBODIMENTS

The accompanying drawings are included to provide a further understanding of the invention, and are incorporated in and constitute a part of this specification. The drawings illustrate embodiments of the invention and, together with the description, serve to explain the principles of the invention.

Figure 1:
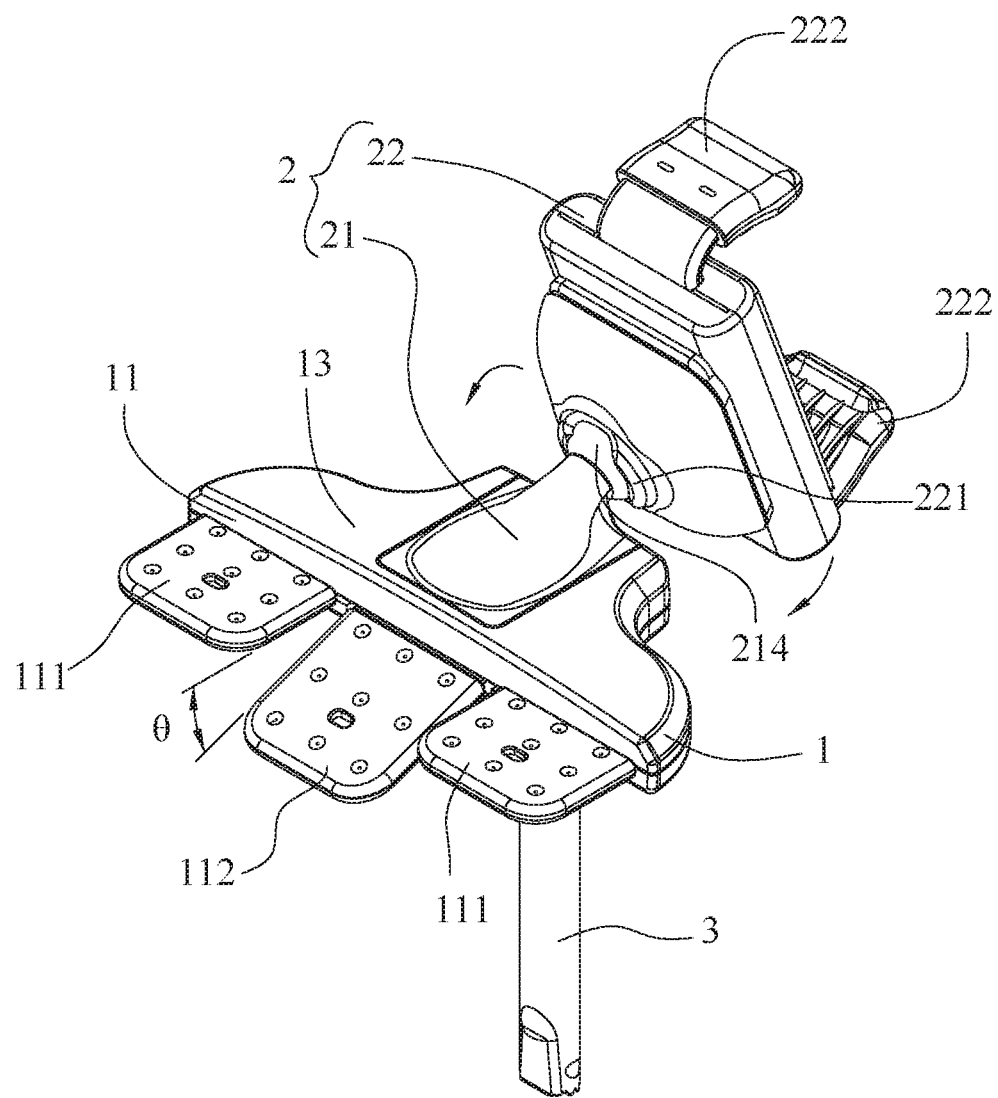
FIG. 1 is a perspective view of a car CD slot mount of the present invention.
Figure 2:
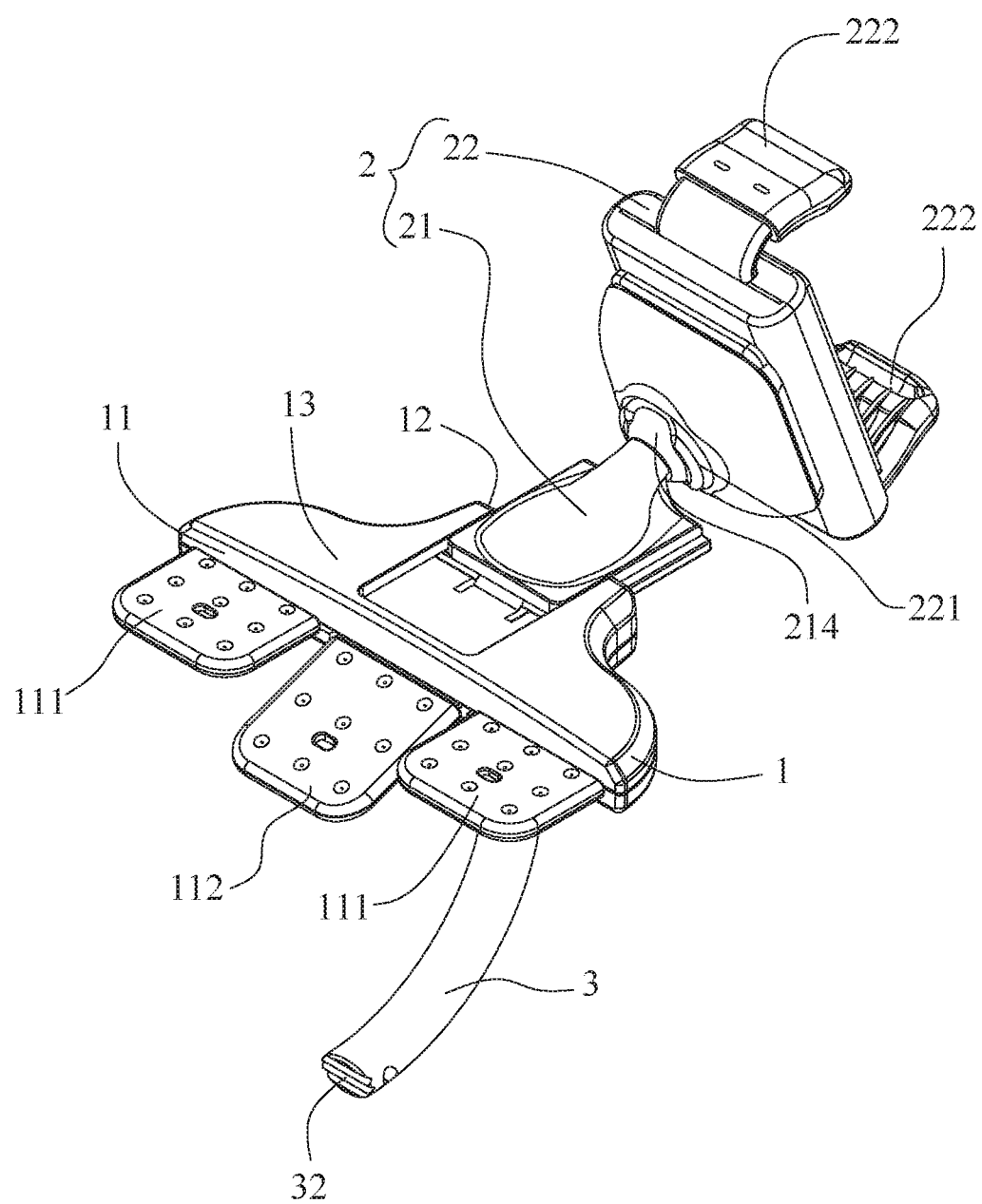
FIG. 2 is a perspective view of the car CD slot mount of the present invention after adjustment.

Referring to FIGS. 1 and 2, wherein, FIG. 1 is a perspective view of a car CD slot mount of the present invention and FIG. 2 is a perspective view of the car CD slot mount of the present invention after adjustment. A car CD slot mount for a personal electronic device according to the present invention includes an installing unit 1, a device fixing unit 2 and a bendable support bar 3. The installing unit 1 is adapted to be inserted into the car CD slot formed in the car dashboard of a car in order to fix the installing unit 1 on the car dashboard while the device fixing unit 2 is intended for holding a personal electronic device, like GPS or mobile phone, thereon. After bending the support bar 3 to a desired configuration, the distal end of the support bar 3 can contact the car dashboard so as to mobilize the entire assembly so as to provide stability of the car CD slot mount of the present invention, thereby facilitating the use of the personal electronic device by the driving person.

Figure 3:
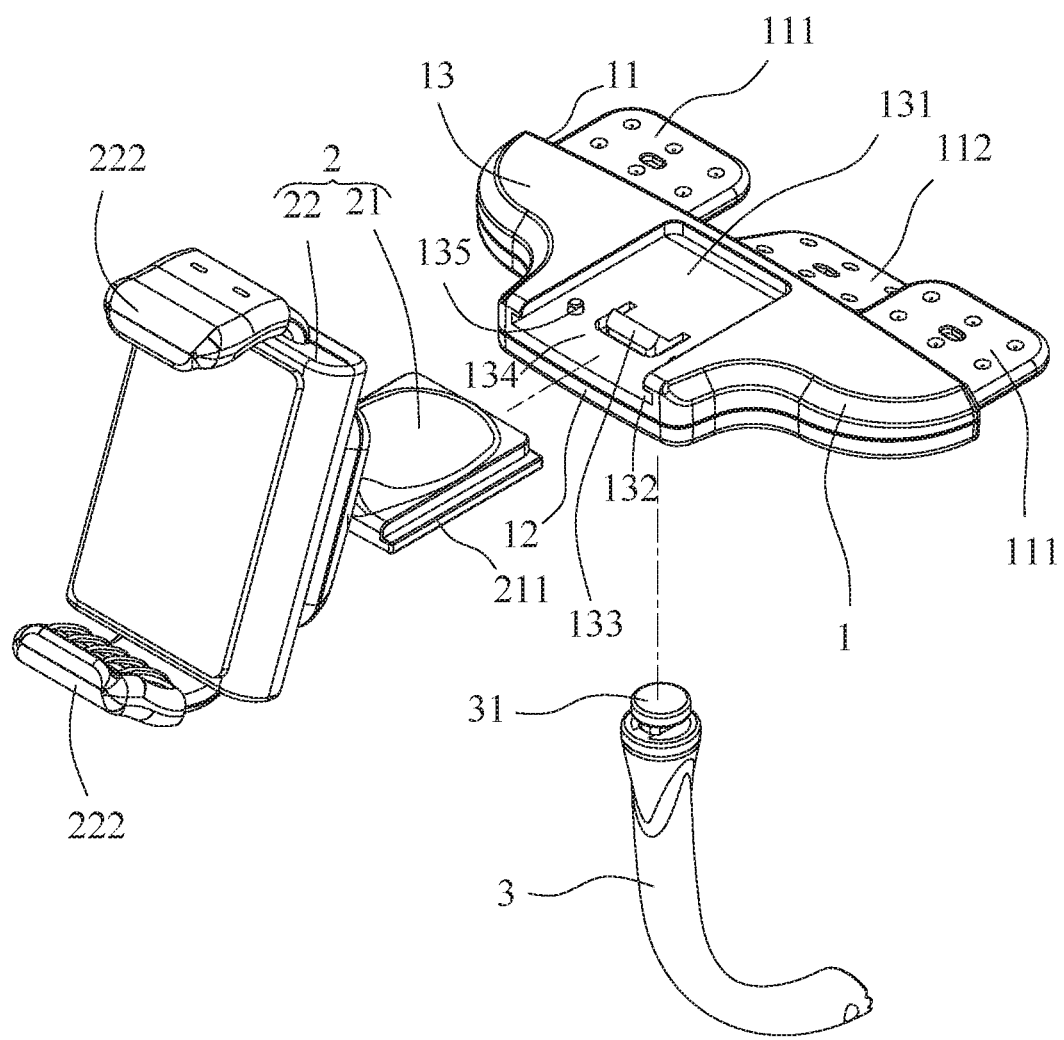
FIG. 3 is an exploded view of the car CD slot mount of the present invention.
Figure 4:
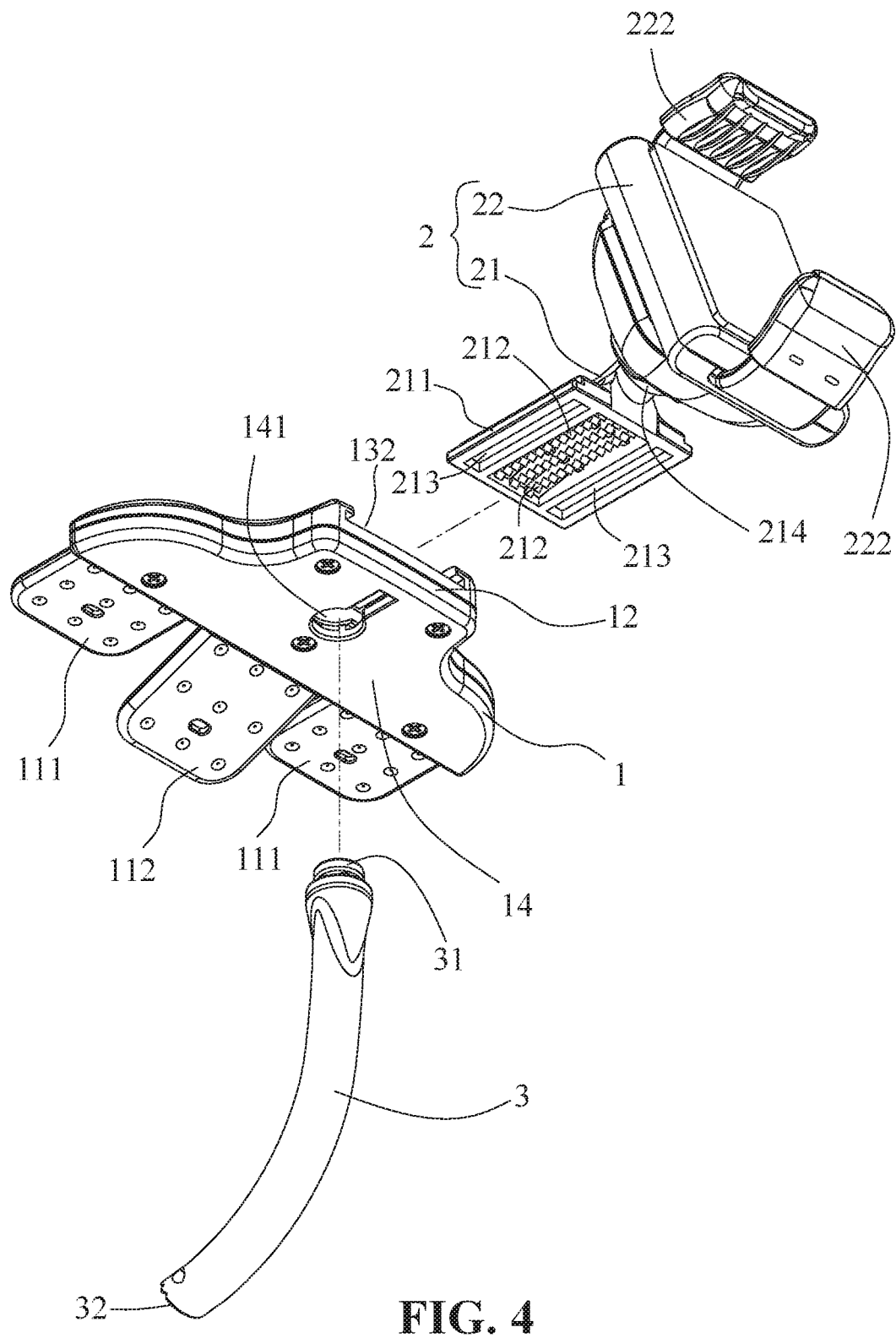
FIG. 4 is an exploded view of the car CD slot mount of the present invention in another angle.

Referring to FIGS. 3 and 4, wherein, FIG. 3 is an exploded view of the car CD slot mount of the present invention and FIG. 4 is an exploded view of the car CD slot mount of the present invention in another angle. As illustrated, the installing unit 1, in form of a flat platform has a front side 11, a rear side 12 opposite to and with a width smaller than a width of the front side 11, at least one first insert 111 and one second insert 112 mounted on the front side 11 in such a manner that the first and second inserts 111, 112 extend outwardly generally in parallel therefrom in a staggered manner so as to define an acute angle θ greater than 5 degrees between the first and second inserts 111, 112. Note that each of the first and second inserts 111, 112 has a limited resiliency such that when no external force is applied thereon (in the normal condition), the first and second inserts 111, 112 incline in opposite directions relative to each other so as to define the acute angle θ of 5 degrees therebetween. Due to this property, the first and second inserts 111, 112 can be inserted securely into the CD slot of the dashboard. It is to note that the front side 11 has a width greater than the width of the CD slot in the car dashboard. The first and second inserts 111, 112 have a total width equivalent to or smaller than the width of the CD slot in the car dashboard. Preferably, some protection sleeves (not shown) can be sleeved over the first and second inserts 111, 112 so as to provide additional friction force and so as not to cause wearing of the periphery confining the CD slot when the first and second inserts 111, 112 are inserted into the CD slot of the dashboard. The flat platform further has upper and lower sides defining upper and lower installing regions 13, 14 respectively, wherein the upper installing region 13 has a bottom surface formed with a sliding channel 131 while the lower installing region 14 has a bottom surface formed with a coupling channel 141. In this embodiment, the rear side 12 defines an entrance 132 for access into the sliding channel 131 of the upper installing region 13 and the sliding channel 131 is designed in such a manner to have a narrowed upper channel portion and a wide lower channel portion, the purpose of which will be explained in the following paragraphs.

The device fixing unit 2 is intended for holding a personal electronic device, like GPS or mobile phone, thereon and includes a fixing element 22 and a location adjustment element 21 having a sliding block 211 inserted slidably into the sliding channel 131 of the flat platform via the entrance 132 and is slidable toward and away from the rear side 12 in order adjust its location with respect to the rear side 12. The location adjustment element 21 further extends upward at partially from the rear side 12 of the flat platform in such a manner to link up with a rear side of the fixing element 22, which holds the personal electronic device securely therein. Preferably, the upper installing region 13 has a resilient teeth 133 formed in the bottom surface of the sliding channel 131. The sliding block 211 has a bottom side formed with at least one elongated rack 212 for meshing with the resilient teeth 133 once the sliding block 21 is disposed in the sliding channel 131. The upper installing region 13 further has a guiding tongue 135 formed in the bottom surface of the sliding channel 131 adjacent to the resilient teeth 133. The bottom side of the sliding block 211 is further formed with a guiding channel 213 permitting extension of the guiding tongue 135 to restrict traveling length of the sliding block 211 along the sliding channel 131 and simultaneously prevents untimely disengagement of the sliding block 211 from the sliding channel 131. Hence, the location of the sliding block 211 in the sliding channel 131 can be retained after adjustment. To be more specific, during mounting of the flat platform 1 with the sliding block 211, a fastener screw is fastened through the platform 1 and its distal end extends into the sliding channel 131 to serve as the guiding tongue 135.

As explained above, the sliding block 211 within the sliding channel 131 is movable due to an external force. To be more specific, the desired location of the sliding block 211 relative to the rear side 12 of the flat platform can be manually moved and the desired location can be retained due to meshing of the resilient teeth 133 and the rack 212 upon removal of the external force while the guiding tongue 135 prevents disengagement of the sliding block 211 from the sliding channel 131. The desired location of the sliding block 211 in the sliding channel 131 can be retained after adjustment. In other words, the distance of the location adjustment element 21 with respect to the front side 11 can be adjusted. Also note that the sliding channel 131 is designed in such a manner to have the narrowed upper channel portion while the sliding block 211 is slidable in the wide lower channel portion, thereby preventing upward removal of the sliding block 211 from the sliding channel 131.

In this embodiment, the fixing element 22 may have different configurations for holding personal electronic device of different configuration, therefore should not be limited only to the disclosed ones. Preferably, the flat platform 1 is linked with the fixing element 22 via the location adjustment element 21 so that the fixing element 22 can be disposed at various angles. Hence, there exists several coupling means between the fixing element 22 and the location adjustment element 21. In one embodiment, the location adjustment element 21 includes a spherical joint 214 located at an elevation above and exterior of the rear side 12 of the flat platform while the fixing element 22 has a carrier base 221 with a reception socket for frictionally and slidably engaging the spherical joint 214 such that the carrier base 221 is rotatable around the spherical joint 214 without disengagement therefrom. Hence, the angle of the fixing element 22 with respect to the flat platform 1 can be varied as required. To be more specific, the fixing element 22 further includes a pair of clamps 222 and a spring unit (not visible) disposed to permit relative movement between the clamps 222, thereby resiliently clamping the personal electronic device between the clamps 222 once the personal electronic device is placed on the fixing element 22.

The bendable support bar 3 is coupled detachably to the coupling channel 141 of the flat platform 1. Preferably, the coupling channel 141 of the flat platform is configured as a key passage with an enlarged portion and a narrowed portion in spatial communication with the enlarged portion. The bendable support bar 3 has a top engagement end 31 of T-shaped cross section such that after extension of the top engagement end 31 into the enlarged portion and later sliding of the top engagement end 31 within the narrowed portion results in engagement of the top engagement end 31 within the coupling channel 141 of the flat platform 1. In this embodiment, the bendable support bar 3 is constituted by a central core of metal and an outer sleeve of plastic material sleeved around the central core. To be more specific, the bendable support bar 3 further has a bottom end portion 32 formed with wavy surface to provide friction force.

Figure 5:
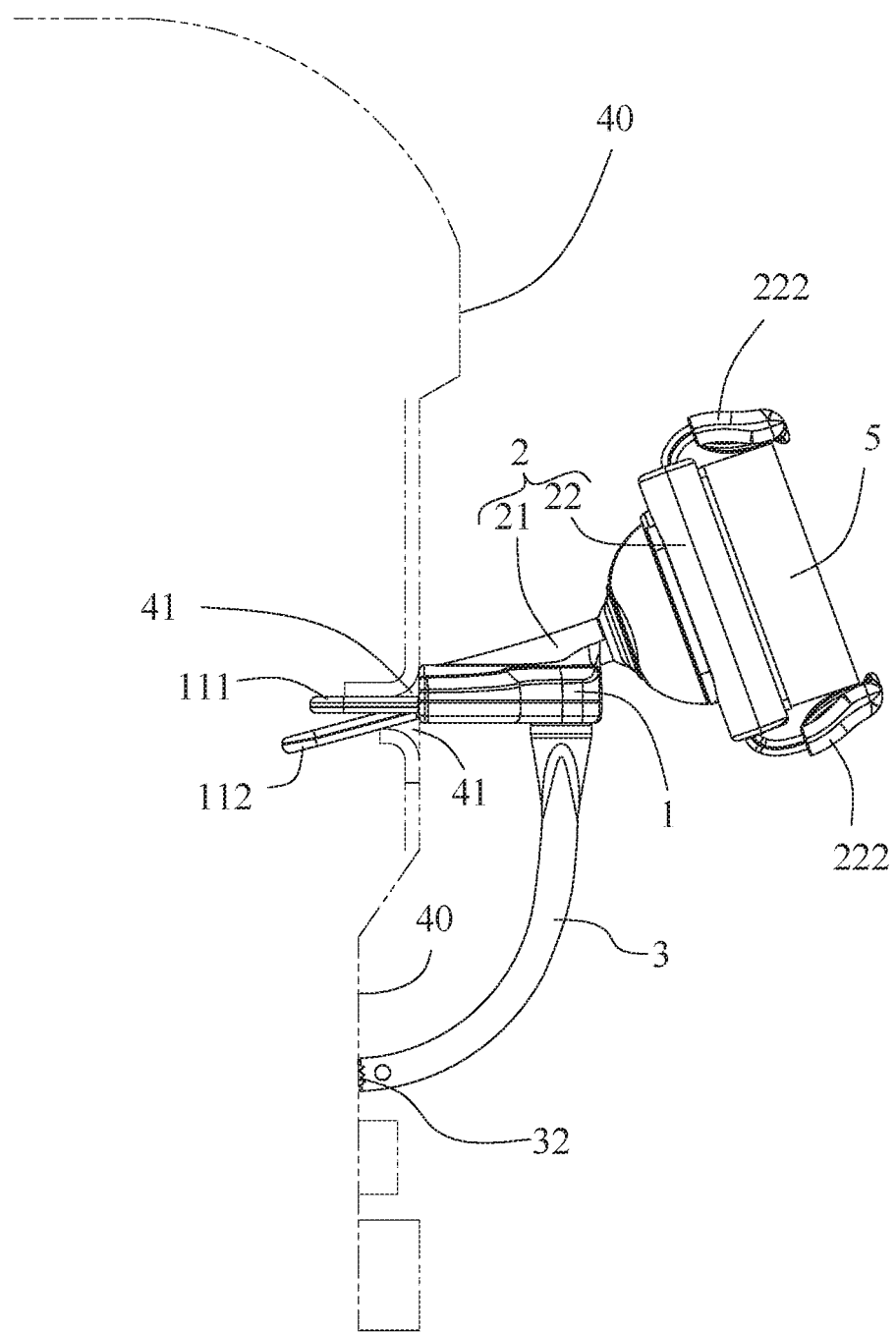
FIG. 5 illustrates the car CD slot mount of the present invention applied in a car.

FIG. 5 illustrates the car CD slot mount of the present invention applied in a car. As illustrated, the car dashboard 40 has a CD slot 41. For mounting the car CD slot mount of the present invention, press the first and second inserts 111, 112 toward each other by two fingers, thereby narrowing the acute angle in such a manner that such that the first and second inserts 111, 112 extend generally perpendicularly from the front side 11 and that the thickness of the first and second inserts 111, 112 becomes smaller than and are inserted into the slot 41. The first and second inserts 111, 112 will be clamped in the slot 41 due to restoration of its initial position upon removal of the applied external force. In other words, the installing unit 1 is mounted on the dashboard 40 of the car. After adjusting the support bar 3 to a desired curvature, the wavy surface at the bottom end portion 32 of the support bar 3 is placed to contact with the dashboard, thereby providing stability of the electronic device 5 being clamped between the clamps 222 of the fixing element 22. The driver of the car can further adjust relative position between the fixing element 22 and the location adjustment element 21 in order to place the electronic device 5 at his desired viewing angle or position.

Figure 6:
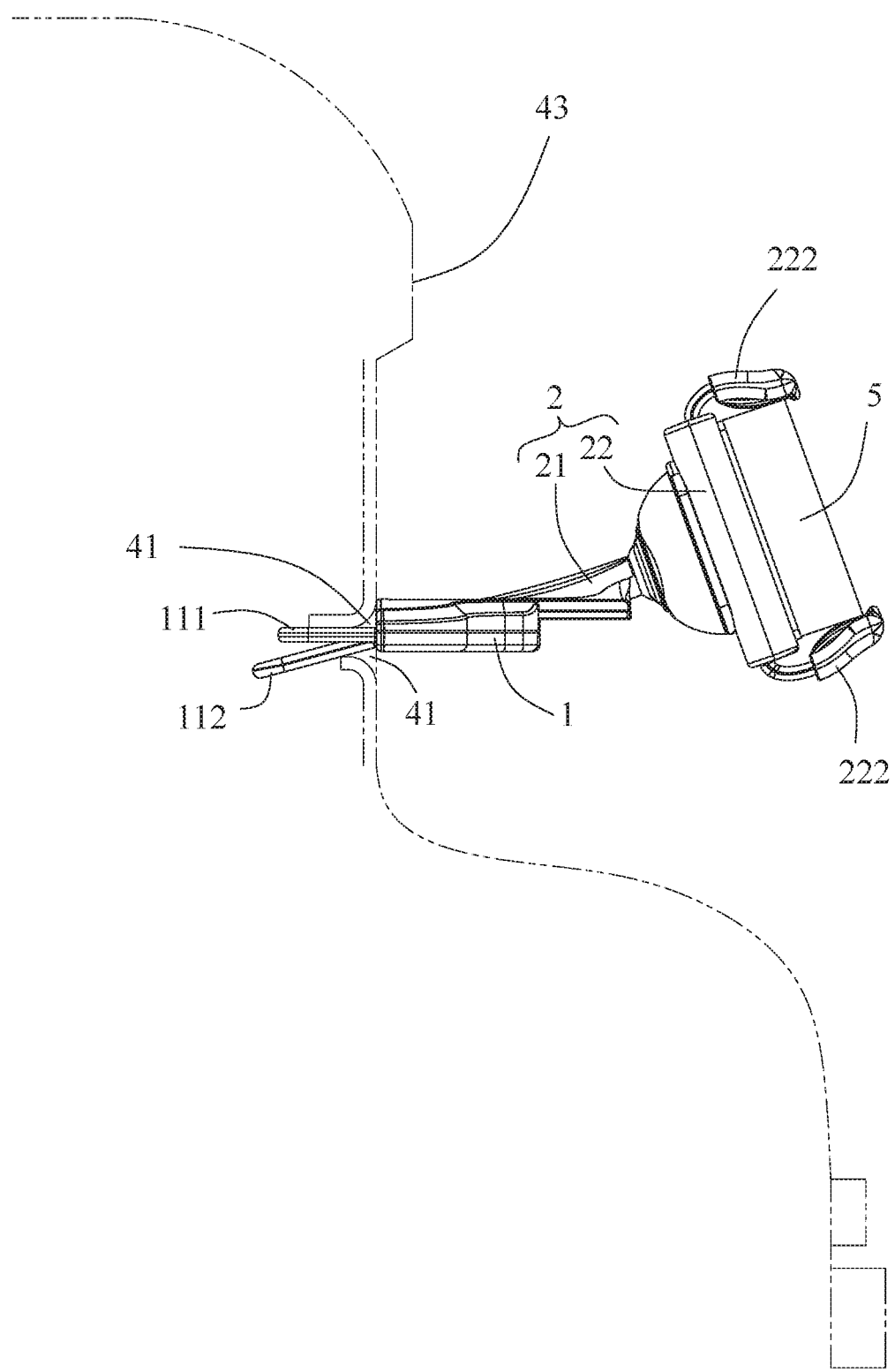
FIG. 6 illustrates the car CD slot mount of the present invention applied in another car.

FIG. 6 illustrates the car CD slot mount of the present invention applied in another car. Note that the present car has a dashboard 43 differs from that shown in FIG. 5. For mounting the car CD slot mount of the present invention, press the first and second inserts 111, 112 toward each other by two fingers, thereby narrowing the acute angle in such a manner that such that the first and second inserts 111, 112 extend generally perpendicularly from the front side 11 such that the thickness of the first and second inserts 111, 112 becomes smaller and are inserted into the slot 41. The first and second inserts 111, 112 will be clamped in the slot 41 due to restoration of its initial position upon removal of the applied external force. In other words, the installing unit 1 is mounted on the dashboard 43 of the car. Due to different configuration of the dashboard 43, the support bar 3 can be detached from the flat platform 1, thereby providing stability of the electronic device 5 being clamped between the clamps 222 of the fixing element 22. The driver of the car can further adjust relative position between the fixing element 22 and the location adjustment element 21 in order to place the electronic device 5 at his desired viewing angle or position.

Although the present invention has been described with reference to the preferred embodiments thereof, it is apparent to those skilled in the art that a variety of modifications and changes may be made without departing from the scope of the present invention which is intended to be defined by the appended claims.

What is claimed is:

1. A car CD (compact disk) slot mount for a personal electronic device, comprising:

an installing unit, in form of a flat platform including a front side, a rear side opposite to with a width smaller than a width of said front side, at least one first insert and one second insert mounted on said front side in such a manner that said first and second inserts extend outwardly therefrom in a staggered manner so as to define an acute angle θ greater than 5 degrees, said flat platform further having upper and lower sides defining upper and lower installing regions respectively, wherein said upper installing region has a bottom surface formed with a sliding channel while said lower installing region has a bottom surface formed with a coupling channel;

a device fixing unit including a fixing element and a location adjustment element having a sliding block disposed in said sliding channel of said flat platform and slidable toward and away from said rear side in order adjust its location with respect to said rear side, said location adjustment element further extending upward at partially from said rear side in such a manner to link up with a rear side of said fixing element which holds a personal electronic device securely therein; and a bendable support bar coupled detachably to said coupling channel of said flat platform.

2. The car CD slot mount according to claim 1, wherein the rear side defines an entrance for access into said sliding channel of said upper installing region and prevents untimely disengagement of said sliding block from said sliding channel.

3. The car CD slot mount according to claim 1, wherein said upper installing region has a resilient teeth formed in said bottom surface of said sliding channel, said sliding block having a bottom side formed with at least one elongated rack for meshing with said resilient teeth once said sliding block is disposed slidably in said sliding channel.

4. The car CD slot mount according to claim 3, wherein said upper installing region has a guiding tongue formed in said bottom surface of said sliding channel adjacent to said resilient teeth, said bottom side of said sliding block being formed with a guiding channel permitting extension of said guiding tongue to restrict traveling length of said sliding block along said sliding channel.

5. The car CD slot mount according to claim 1, wherein said coupling channel of said flat platform is configured as a key passage with an enlarged portion and a narrowed portion in spatial communication with said enlarged portion, said bendable support bar having a top engagement end of T-shaped cross section such that after extension of said top engagement end into said enlarged portion and later sliding of said top engagement end within said narrowed portion results in engagement of said top engagement end within said coupling channel of said flat platform.

6. The car CD slot mount according to claim 1, wherein each of said first and second inserts has a limited resiliency such that when an external force is applied thereon, said first and second inserts incline in opposite directions relative to each other so as to define said acute angle θ of 5 degrees therebetween and removal of said external force restores said first and second inserts to their initial locations.

7. The car CD slot mount according to claim 1, wherein said bendable support bar is constituted by a central core of metal and an outer sleeve of plastic material sleeved around said central core.

8. The car CD slot mount according to claim 1, wherein said bendable support bar further has a bottom end portion formed with wavy surface.

\* \* \* \* \*